(12) United States Patent
Fischbach et al.

(10) Patent No.: US 7,104,658 B2
(45) Date of Patent: Sep. 12, 2006

(54) FOLDABLE EYEPIECE CUP

(75) Inventors: Manfred Fischbach, Himmelkron (DE); Carl Steiner, Bindlach (DE)

(73) Assignee: Steiner-Optik GmbH, Bayreuth (DE)

( * ) Notice: Subject to any disclaimer, the term of this patent is extended or adjusted under 35 U.S.C. 154(b) by 0 days.

(21) Appl. No.: 11/049,932

(22) Filed: Feb. 4, 2005

(65) Prior Publication Data
US 2005/0174647 A1 Aug. 11, 2005

(30) Foreign Application Priority Data
Feb. 5, 2004 (DE) ................. 20 2004 001 705 U

(51) Int. Cl.
*G02B 21/00* (2006.01)
*G02B 23/16* (2006.01)
*G03B 17/00* (2006.01)
*G03B 11/04* (2006.01)

(52) U.S. Cl. .................. 359/611; 359/511; 359/600; 396/448; 396/534

(58) Field of Classification Search ............. 359/600, 359/611, 511; 396/448, 534
See application file for complete search history.

(56) References Cited

U.S. PATENT DOCUMENTS

| | | | | |
|---|---|---|---|---|
| 4,307,931 A | * | 12/1981 | Blake | .......... 359/600 |
| 4,523,818 A | * | 6/1985 | Lang et al. | .......... 359/600 |
| 4,698,857 A | * | 10/1987 | Kastendieck et al. | .......... 2/426 |
| 5,225,932 A | * | 7/1993 | Wannagot et al. | .......... 359/611 |
| 5,784,207 A | | 7/1998 | Satoh | .......... 359/700 |

FOREIGN PATENT DOCUMENTS

| | | |
|---|---|---|
| DE | 243 126 A1 | 2/1987 |
| EP | 1 116 979 A2 | 7/2001 |
| GB | 526605 | 9/1940 |
| JP | 07-43616 | 2/1995 |

\* cited by examiner

*Primary Examiner*—Thong Q Nguyen
(74) *Attorney, Agent, or Firm*—Browdy and Neimark, PLLC

(57) ABSTRACT

A cup for an eyepiece of an optical observation instrument, comprises a peripheral wall which includes an eyepiece-connecting section for connection of the cup to an eyepiece, a transition section which adjoins the eyepiece-connecting section, a light-protecting attachment which, by way of a sectional part of the transition section, is joined to a side of the transition section that is turned away from the eyepiece-connecting section; a sight hole which is laterally defined by the peripheral wall; the peripheral wall being movable into a first, non-folded end position for someone who does not wear spectacles for preclusion of any incidence of stray light upon an eyepiece lens, and into a second, folded end position for spectacle wearers; and into a third stable position of ventilation, located between the first and the second end position, for someone not wearing spectacles.

9 Claims, 3 Drawing Sheets

FOLDABLE EYEPIECE CUP

BACKGROUND OF THE INVENTION

1. Field of the Invention

The invention relates to a cup for an eyepiece of an optical observation instrument, comprising
- a peripheral wall which includes
  - an eyepiece-connecting section, connecting the cup to the eyepiece,
  - a transition section which adjoins the eyepiece-connecting section,
  - a light-protecting attachment which, by way of a sectional part of the transition section, is joined to a side of the transition section that is turned away from the eyepiece-connecting section;
- a sight hole which is laterally defined by the peripheral wall;
- the peripheral wall being movable
  - into a first non-folded end position for someone who does not wear spectacles for preclusion of any incidence of stray light upon an eyepiece lens, and
  - into a second folded end position for spectacle wearers.

2. Background Art

An eyepiece cup of the generic type is known for example from DD 243 126 A1. Spectacle wearers have to fold the cup down in a direction towards the eyepiece. Persons who do not wear spectacles need not fold the cup down: they can profit from the lateral light protection needed in lots of jobs. Upon use, by someone not wearing glasses, of the optical observation instrument that is connected to the eyepiece cup with the cup not folded down, a space produces that is rendered almost airtight towards the surroundings by a lens of the eyepiece, the cup and a user's face. As a result, the temperature within this space rises gradually while the optical observation instrument is used, resulting in the lens misting up, which considerably affects the use of the eyepiece and thus of the optical observation instrument connected thereto.

SUMMARY OF THE INVENTION

It is an object of the invention to embody a cup for an eyepiece of an optical observation instrument in such a way that using the optical observation instrument without any negative effect is possible for someone who does not wear spectacles as well as for spectacle wearers.

According to the invention this object is attained in that the peripheral wall is movable into a third stable position of ventilation, located between the first and the second end position, for someone not wearing spectacles for preclusion of any fogging of the eyepiece lens. The gist of the invention resides in that, in this third stable position of ventilation, air may flow between the surroundings and a space that is defined by a user's face, the eyepiece cup and an eyepiece lens. This flow of air precludes any increase in temperature and thus any fogging of the eyepiece lens when used by someone not wearing glasses.

In keeping with another embodiment of the invention, it is advantageously provided that the peripheral wall consists of flexible plastic or rubber material. These materials enable the peripheral wall to be folded down easily into a corresponding position.

According to an advantageous embodiment, the peripheral wall is foldable in the vicinity of the transition section, ensuring the second folded end position. The result is a level spectacle-contact edge in this second folded end position.

Appropriately, the peripheral wall is foldable in the vicinity of the light-protecting attachment, ensuring the third stable position of ventilation. In this third position of ventilation, there is flow between the surroundings and the above-mentioned space, enabling the space to be ventilated.

Preferably, the light-protecting attachment comprises a reinforcing bead for a fold-down edge of controlled extension to be produced for the third stable position of ventilation, the fold-down job thus being controlled.

Another advantageous embodiment distinguishes itself by a free contact edge which exists in the third stable position of ventilation and which is not level.

By advantage a contact bead is provided at the free end of the peripheral wall.

A one-piece peripheral wall is of considerable advantage. It helps in manufacture at a low cost.

Details of the invention will become apparent from the ensuing description of a preferred exemplary embodiment, taken in conjunction with the drawing.

DESCRIPTION OF A PREFERRED EMBODIMENT

Figure 1:
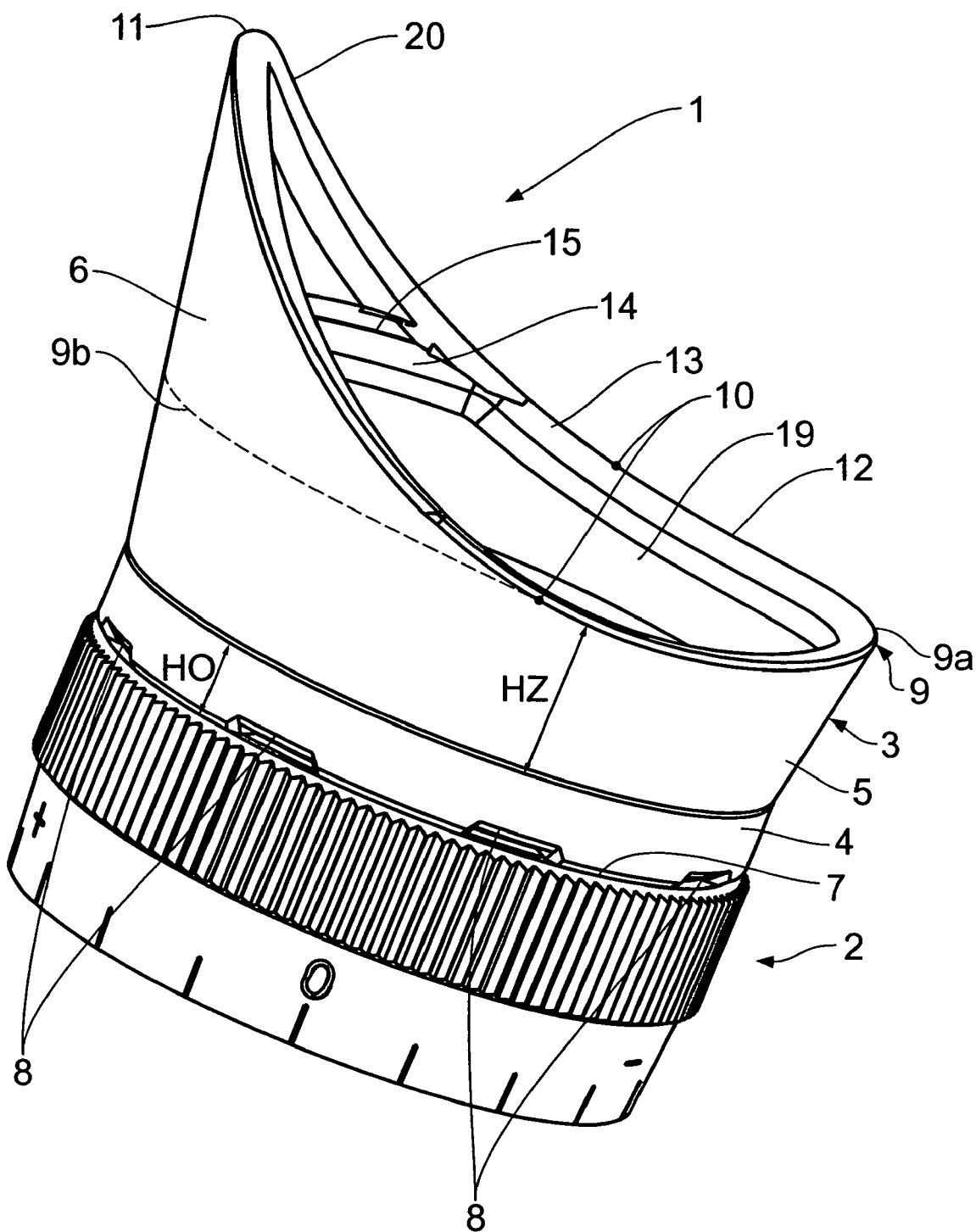
FIG. 1 is a perspective view of a cup that is fixed to an eyepiece with its peripheral wall in an end position not folded down.
Figure 2:
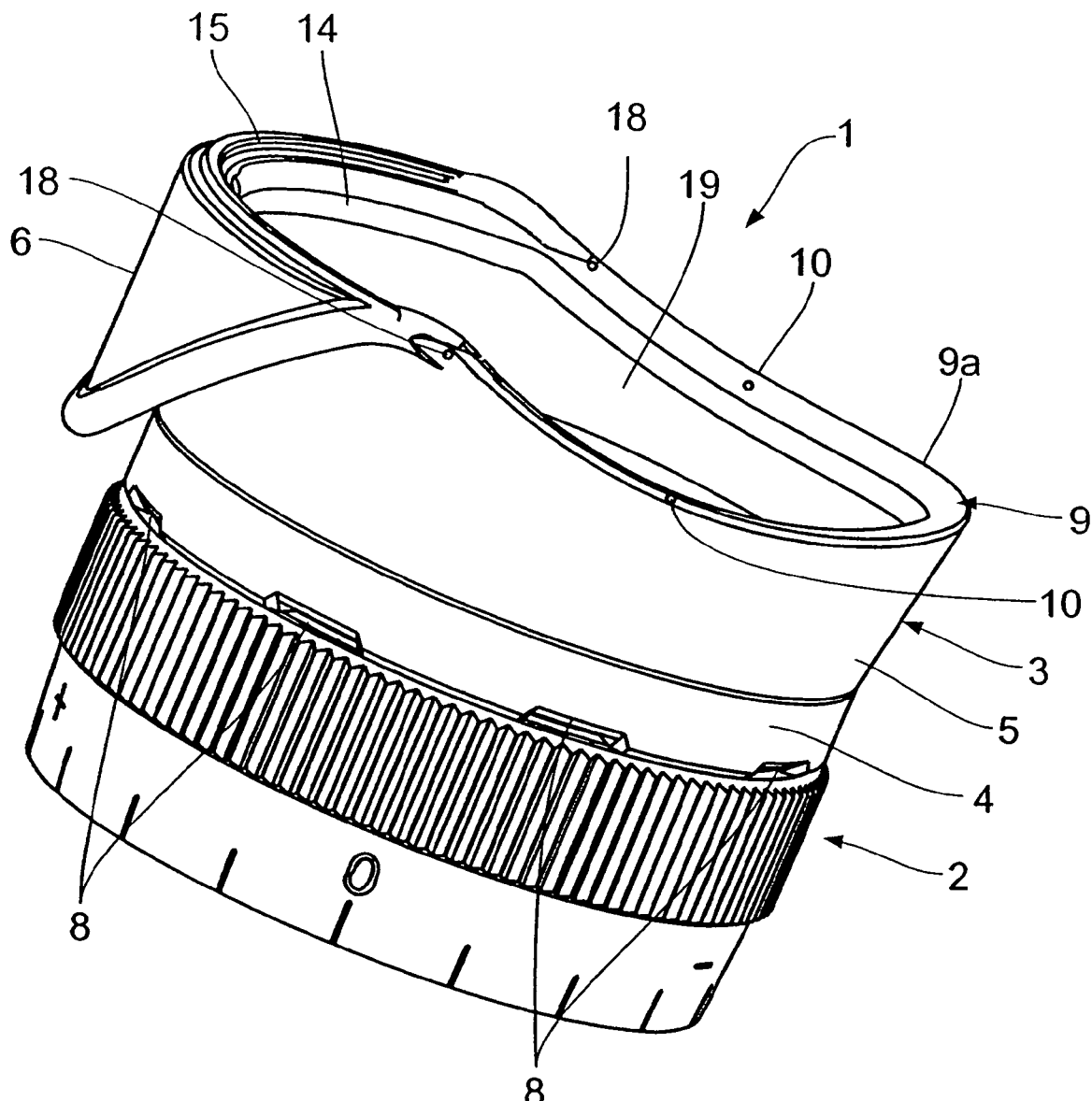
FIG. 2 is an illustration of the eyepiece cup seen in FIG. 1 with its peripheral wall in the position of ventilation.
Figure 3:
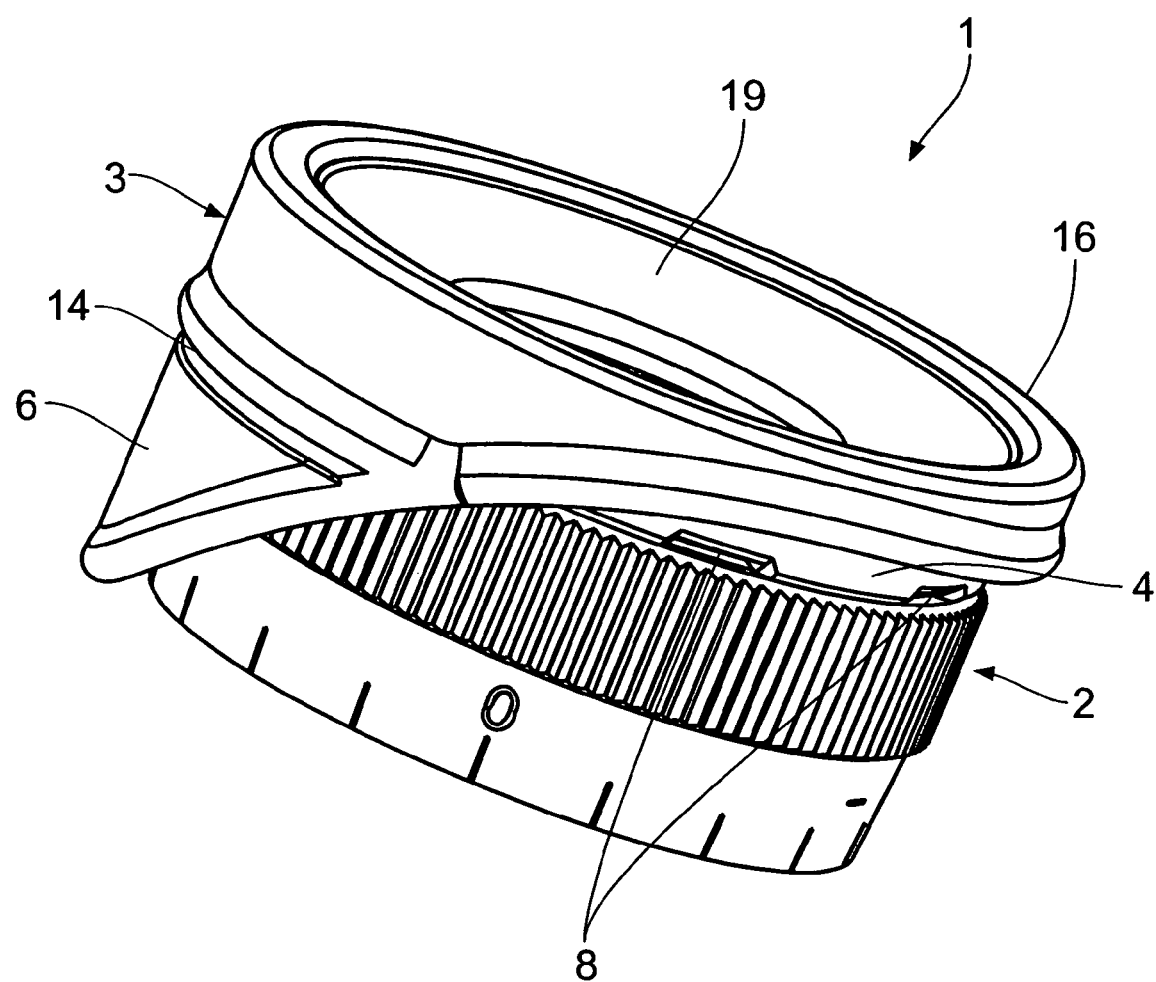
FIG. 3 is an illustration of the eyepiece cup seen in FIGS. 1 and 2 with its peripheral wall being in the second folded end position.

An eyepiece cup 1 seen in FIGS. 1 to 3 is mounted on an eyepiece 2 of an optical observation instrument. The optical observation instrument may be for instance a microscope, binoculars or a telescope.

The eyepiece cup 1 is comprised of a one-piece peripheral wall 3 of flexible plastic material or rubber material. The peripheral wall 3 includes an eyepiece-connecting section 4, which adjoins the eyepiece 2, for connection of the eyepiece cup 1 to the eyepiece 2; a transition section 5 which adjoins the eyepiece-connecting section 4; and a light-protecting attachment 6 which is joined to the side of the transition section 5 that faces away from the eyepiece-connecting section 4. The light-protecting attachment 6 is connected to the transition section 5 only by a part of the circumference thereof. The peripheral wall 3 laterally defines a sight hole 19 which is located above an eyepiece lens (not shown).

The eyepiece-connecting section 4 extends from a free bottom edge 7, adjoining the eyepiece 2, of the peripheral wall 3 over a height HO and is annular in cross-sectional shape. It further possesses a substantially constant outside and inside diameter. The eyepiece-connecting section 4 is provided with air-admission holes 8 which stretch from the free edge 7 in a direction towards the transition section 5. Consequently, the air-admission holes 8 are located above the eyepiece 2. Air is admitted from outside through the air-admission holes 8, entering into flow passages (not shown) which lead the air to the lens that is disposed inside the eyepiece 2, keeping the lens non-fogging. The air current inside the flow passages is deflected. This precludes any penetration of light through the air-admission holes 8, and the air current will not directly hit the eye.

The transition section 5 has a substantially constant height HZ. The height HZ is approximately twice the height HO of the eyepiece-connecting section 4. The transition section 5 extends from the eyepiece-connecting section 4 as far as to an end portion 9. Outside the light-protecting attachment 6, the end portion 9 forms a free edge 9a of the peripheral wall 3. In FIG. 1, a dashed line shows the extension of the end portion 9 of the transition section 5 in the vicinity of the light-protecting attachment 6. This is where the reference numeral 9b is allocated to the end portion 9. The transition section 5 also has an annular cross-sectional shape, however extending conically, which means that the transition section 5 extends from the eyepiece-connecting section 4 upwards and outwards.

Outside the light-protecting attachment 6, the peripheral wall 3 has a constant height, composed of the heights HO and HZ.

The curved light-protecting attachment 6, which is connected to the transition section 5, stretches over approximately half the circumference of the transition section 5. It extends from the end portion 9b upwards and outwards. Starting from the two lateral ends 10 of the light-protecting attachment 6, the height of the light-protecting attachment 6 gradually increases, reaching its maximum at the point 11 approximately centrally between the two ends 10.

A top free edge 12 of the peripheral wall 3, which faces away from the bottom free edge 7 thereof, is comprised of the free edge 9a of the transition section 5 and the free edge 20 of the light-protecting attachment 6. A contact bead 13 for placement against a user's face stretches along the free edge 12. The eyepiece-connecting section 4, the transition section 5 and the light-protecting attachment 6 have a substantially uniform thickness.

On the inside of the light-protecting attachment 6, provision is made for a reinforcing bead 14 which is connected to the contact bead 13. The reinforcing bead 14 extends above the end portion 9 of the transition section 5 and below the point 11. The reinforcing bead 14 pre-determines the course of a fold-down edge 15 for the third stable position of ventilation; it runs approximately parallel to the free edge 7 which the free end portion 9 is also parallel to.

The first, non-folded end position seen in FIG. 1 is intended for persons not wearing glasses. The lateral light-protecting attachment 6 precludes any interfering incidence of light on an eyepiece lens. In the area of contact, the peripheral wall 3 has a configuration that conforms to the contours around the human eye. The contact bead 13 must be applied to a user's face.

The second, folded end position seen in FIG. 3 is meant for spectacle wearers. The peripheral wall 3 is folded down within the transition section 5. The spectacle-contact edge 16, which is produced by folding for application to a lens of a user's spectacles, is level and thus able to conform to the lens of the user's spectacles. The spectacle-contact edge 16 is parallel to the free edge 7. The peripheral wall 3 is folded down preferably at half the height between the free edge 7 and the end portion 9. For controlled folding, the transition section 5 may be provided with a reinforcing bead or material weakening.

The third, stable position of ventilation seen in FIG. 2 is intended for persons not wearing spectacles. The reinforcing bead 14 pre-determines the accurate march of the fold-down edge 15. Owing to the reinforcing bead 14, the march of the fold-down edge 15 is not affected by any minor forces that result from the application to the user's face. As mentioned, the fold-down edge 15 extends above the end portion 9. Consequently, someone not wearing glasses will profit from lateral light protection also in the position of ventilation. A ventilation aperture is produced, approximately extending between the fold-down edge 15 and the temple of a person not wearing glasses. The ventilation aperture thus extends in proximity to the fold-down edge 15. It stretches between the points 18, which are located approximately where the contact bead 13 and the reinforcing bead 14 intersect. The free edge 9a must be applied to a user's face and, in the position of ventilation, constitutes a contact edge for application to a user's face. The free edge 9a and the fold-down edge 15 are approximately parallel to each other. As seen in FIG. 2, the folded light-protecting attachment 6 rests on the outside of the transition section 5.

What is claimed is:

1. A cup for an eyepiece of an optical observation instrument, comprising
   a) a peripheral wall (3) which includes
      i) an eyepiece-connecting section (4) for connection of the cup to an eyepiece (2),
      ii) a transition section (5) which adjoins the eyepiece-connecting section (4),
      iii) a light-protecting attachment (6) which, by way of a sectional part of the transition section (5), is joined to a side of the transition section (5) that is turned away from the eyepiece-connecting section (4);
   b) a sight hole (19) which is laterally defined by the peripheral wall (3);
   c) the peripheral wall (3) being movable
      i) into a first non-folded end position for someone who does not wear spectacles for preclusion of any incidence of stray light upon an eyepiece lens,
      ii) into a second folded end position for spectacle wearers, and
      iii) into a third stable position of ventilation, located between the first and the second end positions, for someone not wearing spectacles for preclusion of any fogging of the eyepiece lens, wherein, for the third stable position of ventilation, the light-protecting attachment (6) comprises a reinforcing bead (14) which assists in producing a fold-down edge (15) of controlled extension and predetermined size, the reinforcing bead (14) pre-determining an accurate march of the fold-down edge (15), wherein due to the reinforcing bead (14) the march of the fold-down edge (15) is not affected by any minor forces.

2. An eyepiece cup according to claim 1, wherein the peripheral wall (3) consists of flexible plastic material or rubber material.

3. An eyepiece cup according to claim 1, wherein, for the second folded end position, the peripheral wall (3) is foldable in the vicinity of the transition section (5).

4. An eyepiece cup according to claim 1, wherein, for the third stable position of ventilation, the peripheral wall (3) is foldable in the vicinity of the light-protecting attachment (6).

5. An eyepiece cup according to claim 1, wherein a free contact edge (9a, 15) exists in the third stable position of ventilation and is not level.

6. An eyepiece cup according to claim 1, wherein a contact bead (13) is provided on the free end of the peripheral wall (13).

7. An eyepiece cup according to claim 1, wherein the peripheral wall (3) is formed in one piece.

8. An eyepiece cup according to claim 1, wherein the light-protecting attachment (6) is connected to the transition section (5) over approximately half the circumference thereof.

9. An eyepiece cup according to claim 8, wherein said reinforcing bead (14) projects inward from the light-protecting attachment (6) when the peripheral wall (3) is in the first non-folded end position.

* * * * *